Aug. 3, 1926.
F. G. LILJENROTH
1,594,372
METHOD OF PRODUCING HYDROGEN AND PHOSPHORIC ACID
Filed March 2, 1923
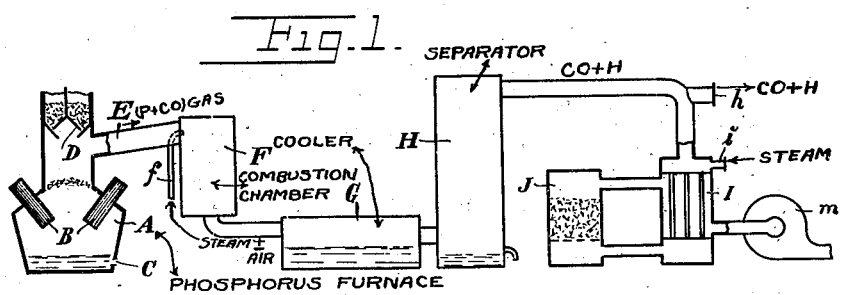
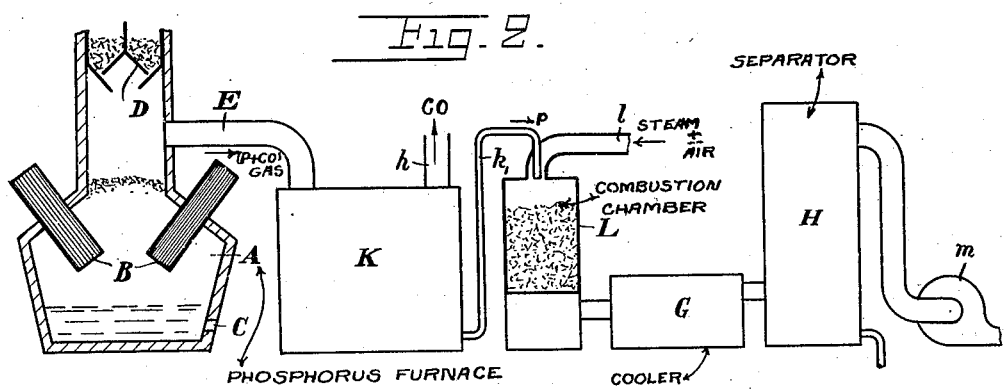
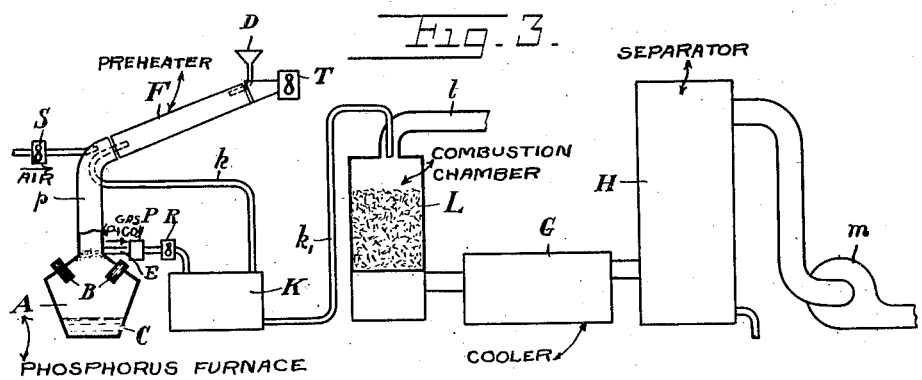

Patented Aug. 3, 1926.

1,594,372

UNITED STATES PATENT OFFICE.

FRANS GEORG LILJENROTH, OF STOCKSUND, SWEDEN, ASSIGNOR TO PHOSPHORUS-HYDROGEN COMPANY, A CORPORATION OF MAINE.

METHOD OF PRODUCING HYDROGEN AND PHOSPHORIC ACID.

Application filed March 2, 1923, Serial No. 622,401, and in Sweden August 28, 1922.

This invention relates to an improved method of producing hydrogen and phosphoric acid.

It is a well-known process to produce phosphoric acid by heating phosphate rock with carbon and silica for instance in an electric furnace and burning the evolved gases, containing phosphorus. In such process the tricalcium-phosphate contained in the phosphate rock reacts with the carbon and the silica so that free phosphorus, carbon monoxide and calcium silicate are formed according to the formula:

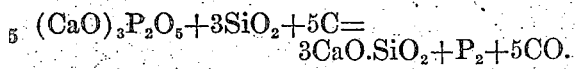
$(CaO)_3P_2O_5 + 3SiO_2 + 5C = 3CaO.SiO_2 + P_2 + 5CO.$

The calcium silicate forms a slag which is drawn off from the furnace. The escaping gas mixture which contains phosphorus in gaseous state, and carbon monoxide, was in all thermic processes of manufacturing phosphoric acid hitherto known burned by means of the oxygen of the air into phosphorus pentoxide and carbon dioxide. In such known processes it was, therefore, usual to supply at least such a quantity of air as was required for the complete combustion of the total quantity of phosphorus and carbon monoxid to form phosphorus pentoxide and carbon dioxide. The heat developed in such combustion was for instance used for preheating the charge for the reduction furnace. The phosphorus pentoxide was then transformed into phosphoric acid by hydration with water in well-known manner.

The chief object of the present invention is to utilize the chemical energy of the phosphorus in a more economical manner than hitherto was possible in the thermic process of manufacturing phosphoric acid.

The invention consists chiefly in reacting upon phosphorus by means of water (hydrogen monoxid) in such way that the phosphorus is transformed essentially into phosphorus pentoxide and hydrogen is liberated. The energy developed when the phosphorus is converted into phosphorus pentoxide is utilized for breaking the chemical bonds between the oxygen and the hydrogen in the water molecules so that the hydrogen is set free. The reaction is, preferably, carried out at a temperature of 1000° C. or more. At temperatures far below this, the yield of free hydrogen would be lower, due to the formation of increasing quantities of phosphine.

The hydrogen thus obtained may, preferably, be used for the manufacture of ammonia by combining it with nitrogen in well-known manner. When using the present invention in combination with the synthetic production of ammonia it will thus not be necessary to have a large and expensive electrolytic or other special plant for decomposing water into its constituents, nor will the production of hydrogen require any large quantities of electrical energy or of carbon which otherwise are necessary. The ammonia thus produced may be combined with the phosphoric acid simultaneously produced, to form ammonium phosphate, if desired.

It is, of course, not necessary to use water exclusively for the conversion of the phosphorus but the invention covers also the case in which a part of the phosphorus is burned by means of oxygen. In such cases steam and air can be mixed in proper proportions beforehand, before they are supplied to the phosphorus or the water or steam may be first supplied and then air, or vice versa.

In most cases I prefer firstly to separate the furnace gases obtained in reducing phosphate rock by means of carbon and silica into their components, phosphorus and carbon monoxide, and then react upon the phosphorus by means of steam or by means of steam mixed with air and upon the carbon monoxide by means of air. The heat of combustion of the carbon monoxide can in such case be utilized for preheating the charge, for generating steam, and so on.

In the accompanying drawings I have shown in Figs. 1 to 3 diagrammatically three embodiments of apparatus for carrying the method into practice.

Referring to Fig. 1 of the drawings, A is an electric furnace for reducing phosphate rock by means of carbon in presence of silica, said furnace having electrodes B, a tap hole C for the slag, a charging hopper D and a gas exit E, by which the gas mixture formed in the furnace and consisting essentially of phosphorus and carbon monoxide is conducted to a combustion chamber F, which may contain a suitable filling material, such as chamotte, bauxite, iron oxide or the like, and to which also water or steam, (optionally mixed with a regulated quantity of air), is supplied through a supply pipe $f$. A temperature of, say, about 1000° C. is maintained in the chamber F and at such elevated temperature the phosphorus reacts with the water while the carbon monoxide remains unaltered. Preferably only such quantity of water or steam (hereinafter referred to as hydrogen monoxid) is supplied to the chamber F as is required for the conversion of the phosphorus. The resulting gas mixture consisting essentially of phosphorus pentoxide, carbon monoxide and hydrogen is then introduced into a cooler G and a separator H wherein the phosphorus pentoxide is separated from the non-condensable gases in any suitable manner, for instance by electrical precipitation or by absorption in water so that phosphoric acid is formed by hydration. The remaining gas mixture consisting essentially of carbon monoxide and hydrogen is mixed with a suitable quantity of steam which is supplied through the pipe $i$ and is then heated in a recuperator I whereupon it is brought into contact with a suitable catalyzer in the chamber J held at such temperature that the carbon monoxide reacts with the water so that carbon dioxide is formed while the hydrogen of the water is set free in well-known manner. The resulting gas mixture is removed by the ventilator $m$ and purified from the carbon dioxide and other impurities and is then ready for use. Instead of leading the whole quantity of gases from the separator H through the recuperator I and the chamber J a part thereof can be taken out through the pipe $h$ and utilized for generating steam or for other purposes.

The use of catalyzers in the reaction chamber in which the hydrogen monoxid and phosphorus react to form hydrogen and phosphoric anhydrid, is not claimed herein, but in a copending application Ser. No. 663,493, filed September 18, 1923, by myself and Markus Larsson.

In Fig. 2 A is an electric furnace for reduction of phosphate rock by means of carbon and silica said furnace having electrodes B, slag hole C, charging hopper D and gas exit E. From the latter the gases evolved in the furnace A are conducted to a condenser K in which the phosphorus is condensed. The non-condensable gas consisting essentially of carbon monoxide leaves the condenser at $h$ and may be utilized in any suitable manner, as for instance for producing hydrogen by reaction with steam, or for generating steam, or the like. The phosphorus condensed in the condenser K is conducted in molten state through the pipe $k_1$ to the combustion chamber L. To said chamber which preferably is filled with some suitable filling or catalytically acting material and is held at a temperature of, say 1000° C. steam, optionally mixed with a small quantity of air is supplied through the pipe $l$. When air is also used, the proportion of steam and air is so regulated that the phosphorus after evaporation reacts partly with the oxygen of the air but essentially with the steam, the hydrogen of which is set free. The resulting gas mixture is then introduced in the cooler G and the separator H wherein the phosphorus pentoxide is condensed and separated from the non-condensable gas in any well-known manner, for instance by absorption in water so that phosphoric acid is formed. The remaining gas mixture consisting essentially of hydrogen optionally mixed with a quantity of nitrogen, for instance in the proportion 3 to 1, is removed by the ventilator $m$ and purified and is then ready for use, for instance for the synthetic manufacture of ammonia.

In Fig. 3 A is an electric furnace for reduction of phosphate rock by means of carbon and silica, said furnace having electrodes B, slag hole C and gas exit E. From the latter, the gas mixture formed in the furnace is conducted through a cooler or steam generator P and a ventilator R to the condenser K wherein the phosphorus is condensed. The non-condensable gas consisting essentially of carbon monoxide is conducted through a pipe $k$ to the preheater F wherein it is burned by means of air supplied by the fan S. The heat developed by the combustion of the carbon monoxide is utilized for preheating the charge which is supplied to the furnace through said preheater. The preheater may be in the form of a rotary furnace, to the upper end of which the charge is supplied through a hopper D. The combustion gases are removed from the rotary furnace by the ventilator T. The speeds and the dimensions of the ventilators R, S, and T are chosen in such manner that a slow streaming of gas in a direction downwards through the pipe $p$ connecting the reduction furnace A with the preheating furnace F is obtained whereby the effect is reached that all phosphorus escapes through the pipe E and is condensed in the chamber K while no phosphorus vapor but carbon monoxide only enters the preheater through pipe $k$.

The phosphorus separated in the condenser K is conducted in molten state through the pipe $k_1$ to the combustion chamber L. To said chamber which preferably is filled with some suitable filling or catalytic acting material also steam and optionally a small quantity of air is supplied through the pipe $l$. By suitably proportioning the quantities of steam and air, such a temperature is maintained in the combustion chamber that the phosphorus after evaporation is converted into phosphorus pentoxide partly by the oxygen of the air but mainly by the steam which a corresponding quantity of hydrogen is liberated. The resulting gas mixture is then introduced into the cooler G and the separator H wherein the phosphorus pentoxide is condensed and separated in any well-known manner. The remaining non-condensable gas mixture consisting essentially of hydrogen optionally mixed with a quantity of nitrogen, for instance in the proportion 3 to 1, is removed by the ventilator $m$ and purified and is then ready for use.

Certain features of the present invention are claimed in my copending divisional application, Serial No. 714,546, filed May 20, 1924.

What I claim is:

1. The method of producing hydrogen and phosphoric acid, comprising reacting upon elementary phosphorus by means of hydrogen monoxid under such conditions as to transform the phosphorus essentially into phosphorus pentoxide with liberation of hydrogen.

2. Method of producing hydrogen and phosphoric acid, comprising reacting upon elementary phosphorus by means of steam under such conditions that the phosphorus is transformed essentially into phosphorus pentoxide and hydrogen is liberated.

3. Method of producing hydrogen and phosphoric acid, comprising reacting upon elementary phosphorus by means of steam at an elevated temperature, thus transforming the phosphorus essentially into phosphorus pentoxide while hydrogen is liberated, and separating the phosphorus pentoxide from the hydrogen by absorption in water.

4. Method of producing hydrogen and phosphoric acid, comprising reacting upon elementary phosphorus by means of steam at an elevated temperature and simultaneously burning a part of the phosphorus by means of oxygen, thus converting the phosphorus essentially into phosphorus pentoxide while hydrogen is liberated.

5. Method of producing hydrogen and phosphoric acid, comprising reacting upon elementary phosphorus in gaseous state by means of steam at an elevated temperature and simultaneously combusting a part of the phosphorus by means of oxygen, thus transferring the phosphorus essentially into phosphorus pentoxide while hydrogen is liberated, and separating the phosphorus pentoxide from the hydrogen by absorption in water.

6. Method of producing hydrogen and phosphoric acid, comprising reacting upon elementary phosphorus in gaseous state by means of steam at a temperature of at least 1000° C., thus transforming the phosphorus essentially into phosphorus pentoxide and liberating hydrogen.

7. Method of producing hydrogen and phosphoric acid, comprising reacting upon elementary phosphorus in a gaseous state by means of steam at an elevated temperature and simultaneously burning part of the phosphorus by means of atmospheric air, thus transforming the phosphorus essentially into phosphorus pentoxide while hydrogen is set free, absorbing the phosphorus pentoxide in water, and collecting the remaining gas mixture.

8. Method of producing hydrogen and phosphoric acid, comprising reducing a phosphatic material with carbon so as to liberate phosphorus, and reacting upon the latter with hydrogen monoxid, under conditions adapted to liberate hydrogen.

9. Method of producing hydrogen and phosphoric acid, comprising reducing a phosphatic material with carbon so as to produce a gas mixture consisting essentially of phosphorus in gaseous state and carbon monoxide, and treating the phosphorus of said gas mixture with steam at such temperature that the phosphorus is transformed essentially into phosphorus pentoxide and hydrogen is liberated.

10. Method of producing hydrogen and phosphoric acid, comprising reducing a phosphatic material with carbon, so as to produce a gas mixture consisting essentially of phosphorus in gaseous state and carbon monoxide, and reacting upon the phosphorus of said gas mixture with hydrogen monoxid and free oxygen under such conditions that hydrogen is liberated from the hydrogen monoxid.

11. Method of producing hydrogen and phosphoric acid, comprising reducing a phosphatic material with carbon so as to produce a gas mixture consisting essentially of phosphorus and carbon monoxide, and reacting upon the phosphorus and the carbon monoxide by means of hydrogen monoxid in such manner that hydrogen is liberated.

12. A process of making hydrogen and oxygenated compounds of phosphorus which comprises reacting on elemental phosphorus with hydrogen monoxid in the absence of such an amount of free oxygen as would oxidize all the phosphorus, while at a temperature capable of producing free hydrogen and oxygenated compounds of phosphorus.

13. A process of making hydrogen-nitrogen mixture and oxygenated compounds of phosphorus which comprises reacting on elemental phosphorus with hydrogen monoxid in the presence of some air, the latter being far less than the amount which would burn all the phosphorus, and the reaction being conducted at a temperature high enough to produce mainly free hydrogen and oxygenated compounds of phosphorus from the phosphorus and hydrogen monoxid.

In testimony whereof I have signed my name.

FRANS GEORG LILJENROTH.